US010008188B1

(12) United States Patent
Dabon et al.

(10) Patent No.: US 10,008,188 B1
(45) Date of Patent: Jun. 26, 2018

(54) MUSICAL SCORE GENERATOR

(71) Applicant: KYOCERA Document Solution Inc., Osaka (JP)

(72) Inventors: Philip Ver Dabon, Torrance City, CA (US); Neil-Paul Bermundo, Glendora, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days. days.

(21) Appl. No.: 15/421,287

(22) Filed: Jan. 31, 2017

(51) Int. Cl.

| | |
|---|---|
| ***G04B 13/00*** | (2006.01) |
| ***G10G 1/04*** | (2006.01) |
| ***G10H 1/00*** | (2006.01) |
| ***G06K 15/02*** | (2006.01) |

(52) U.S. Cl.
CPC ........... *G10G 1/04* (2013.01); *G06K 15/1813* (2013.01); *G10H 1/0008* (2013.01); *G10H 2210/066* (2013.01); *G10H 2210/076* (2013.01); *G10H 2210/086* (2013.01); *G10H 2240/161* (2013.01)

(58) Field of Classification Search
CPC ........... G10H 1/0025; G10H 2210/066; G10H 2220/111; G10H 2240/141; G10H 2220/015; G10H 2210/031; G10H 2240/131; G10K 11/16
See application file for complete search history.

(56) References Cited

U.S. PATENT DOCUMENTS 6,156,964 A * 12/2000 Sahai ..................... G09B 15/04 84/470 R
6,740,802 B1 * 5/2004 Browne, Jr. ......... G10H 1/0025 84/609
7,179,982 B2 * 2/2007 Goto ........................ G10D 1/00 348/465
7,314,994 B2 * 1/2008 Hull ......................... G10H 1/00 84/615
7,323,629 B2 * 1/2008 Somani ................ G10H 1/0008 700/94
7,667,125 B2 * 2/2010 Taub ........................ G10H 1/00 84/616
8,244,546 B2 * 8/2012 Nakano .................. G10H 1/366 434/318
8,494,257 B2 * 7/2013 Taub .................... G06K 9/6256 382/113
2008/0190271 A1 * 8/2008 Taub .................... G10H 1/0058 84/645
2014/0020546 A1 * 1/2014 Sumi .................... G10H 1/0008 84/609
2014/0260909 A1 * 9/2014 Matusiak ............. G10H 1/0025 84/609

* cited by examiner

*Primary Examiner* — Marlon Fletcher
(74) *Attorney, Agent, or Firm* — West & Associates, A PC; Stuart J. West

(57) ABSTRACT

A method of generating a musical score file for one or more target musical instruments with a score generation component based on input audio data. The score generation component finds candidate musical notes within the input audio data using a frequency analysis to identify segments that share substantially the same audio frequency, and finds a best match for those candidate musical notes in audio data associated with target musical instruments in a sound database. Note, chord, and/or rhythm information is saved to a musical score file along with a page description header describing print settings. The generated musical score file can then be printed as sheet music or audibly played back over speakers.

20 Claims, 7 Drawing Sheets

Format of Musical Score File 108:

| | Name | Value / Range | Type | Size (Bytes) |
|---|---|---|---|---|
| | File Type Identifier | 0x50504d53 | Byte | 4 |
| | Major Version Number | Numeric | Byte | 4 |
| | Minor Version Number | Numeric | Byte | 1 |
| 302 | Page Description Header | Dynamic | Variable | Variable |
| 304 | Musical Instruments Information | Dynamic | Variable | Variable |
| 306 | Musical Score Data | Dynamic | Variable | Variable |
| | File Trailer Data | Dynamic | Variable | Variable |
| | File Content | Last 128 Bytes | Byte | 128 |

FIG. 3A

Page Description Header:

| Category | Data |
|---|---|
| Media Information | Paper Size<br>Media Type |
| Font Information | Font Name<br>Font Size<br>Font Style<br>Font Color |
| Color Information | Foreground Color<br>Background Color<br>Transparency |
| Layout Information | Orientation<br>Feeding Edge<br>Number of Pages per Sheet (NUP)<br>Duplex<br>Binding |
| Line Style | Thickness<br>Style |
| Finishing Options | Stapling<br>Hole Punch |

FIG. 3B

<u>Page Description Header:</u>
PaperSize: Letter
MediaType: Normal
FontName: TimesNewRoman
FontSize: 12
ForegroundColor: Cyan
BackgroundColor: Gray
Transparency: Opaque
...
Stapling: Off
HolePunch: DoubleLeft

FIG. 3C

Musical Instruments Information:

| Name | Value |
| --- | --- |
| Instrument Identifier 1 | Identifier for Musical Instrument 1 |
| Musical Score Data Offset 1 | Offset for Musical Score Data of Musical Instrument 1 |
| Instrument Identifier 2 | Identifier for Musical Instrument 2 |
| Musical Score Data Offset 2 | Offset for Musical Score Data of Musical Instrument 2 |
| ... | ... |
| Instrument Identifier N | Identifier for Musical Instrument N |
| Musical Score Data Offset N | Offset for Musical Score Data of Musical Instrument N |

FIG. 3D

Musical Score Data:

| Name | Value / Range | Size (Bytes) |
| --- | --- | --- |
| Note/Chord/Beat Identifier | Numeric | 1 |
| Key | Numeric | 1 |
| Length | Time Format | 4 |
| Playback Instruction | Numeric | 1 |
| Playback Start Time | Time Format | 1 |

FIG. 3E

MUSICAL SCORE GENERATOR

BACKGROUND

Field of the Invention

The present disclosure relates to the generation of musical scores from input audio data, particularly the generation of a musical score file that can be printed as sheet music or played back as audio.

Background

Musicians often enjoy composing new pieces of music by playing tunes on a musical instrument. For example, jazz musicians often improvise while playing music. While spontaneously composing music in this way can be fulfilling creatively, such compositions can be lost unless they are being recorded by an audio recorder.

However, even when a composition is recorded, it is a recording of one particular performance of that composition. No sheet music exists so that other musicians can play the composition themselves. Although musicians can manually transcribe recorded notes onto pages of sheet music to create a musical score, that process can be tedious and time-consuming. It can be even more difficult to translate notes played on one musical instrument into sheet music for another musical instrument.

Composers who generate musical scores may also desire to hear how their compositions would sound if they were played by certain instruments, including instruments that the composer does not know how to play. However, media players generally cannot generate audio and play back audio over speakers from traditionally composed sheet music.

What is needed is a system for converting input audio data into a musical score file that can be printed as sheet music and/or played back as audio over speakers.

SUMMARY

The present disclosure provides a method of generating a musical score file. Input audio data can be received at a musical score generation device running a score generation component, along with a selection of one or more target musical instruments. The score generation component can identify candidate musical notes within the input audio data by performing a frequency analysis on the input audio data to identify segments of the input audio data that share substantially the same audio frequency. The score generation component can create a musical score file with a page description header that identifies print settings and a musical instruments information section that identifies the one or more target musical instruments. The score generation component can identify musical note information for the one or more target musical instruments by finding a best match for the candidate musical notes in audio data in a sound database for the one or more target musical instruments, and add the identified musical note information to musical score data associated with the one or more target musical instruments in the musical score file.

The present disclosure also provides a printer comprising a score generation component, a musical score page description language (PDL) raster image processor (RIP), and a print engine. The score generation component can receive input audio data and a selection of one or more target musical instruments. The score generation component can also identify candidate musical notes within the input audio data by performing a frequency analysis on the input audio data to identify segments of the input audio data that share substantially the same audio frequency. The score generation component can create a musical score file with a page description header that identifies print settings and a musical instruments information section that identifies the one or more target musical instruments. The score generation component can identify musical note information for the one or more target musical instruments by finding a best match for the candidate musical notes in audio data in a sound database for the one or more target musical instruments, and add the identified musical note information to musical score data associated with the one or more target musical instruments in the musical score file. The musical score PDL RIP can generate a music score sheet for each target musical instrument identified in the musical instruments information section of the musical score file. The music score sheet for each target musical instrument can be generated based on page description language commands in the page description header and the musical score data associated with that target musical instrument. The print engine can print images on a recording medium according to the music score sheets generated by the musical score PDL RIP.

The present disclosure also provides a musical score generation device comprising a score generation component and a display component. The score generation component can receive input audio data and a selection of one or more target musical instruments. The score generation component can also identify candidate musical notes within the input audio data by performing a frequency analysis on the input audio data to identify segments of the input audio data that share substantially the same audio frequency. The score generation component can create a musical score file with a page description header that identifies print settings and a musical instruments information section that identifies the one or more target musical instruments. The score generation component can identify musical note information for the one or more target musical instruments by finding a best match for the candidate musical notes in audio data in a sound database for the one or more target musical instruments, and add the identified musical note information to musical score data associated with the one or more target musical instruments in the musical score file. The display component can display the identified musical note information in the musical score file on a screen.

BRIEF DESCRIPTION OF THE DRAWINGS

FIG. 3A depicts an exemplary embodiment of a format for a musical score file.

FIG. 3B depicts an exemplary embodiment of a format for a page description header within a musical score file.

FIG. 3C depicts an example of a page description header in the format of FIG. 3B.

FIG. 3D depicts an exemplary embodiment of a format for a musical instrument information section within a musical score file.

FIG. 3E depicts a non-limiting exemplary embodiment of a format for musical score data within a musical score file.

DETAILED DESCRIPTION

Figure 1:
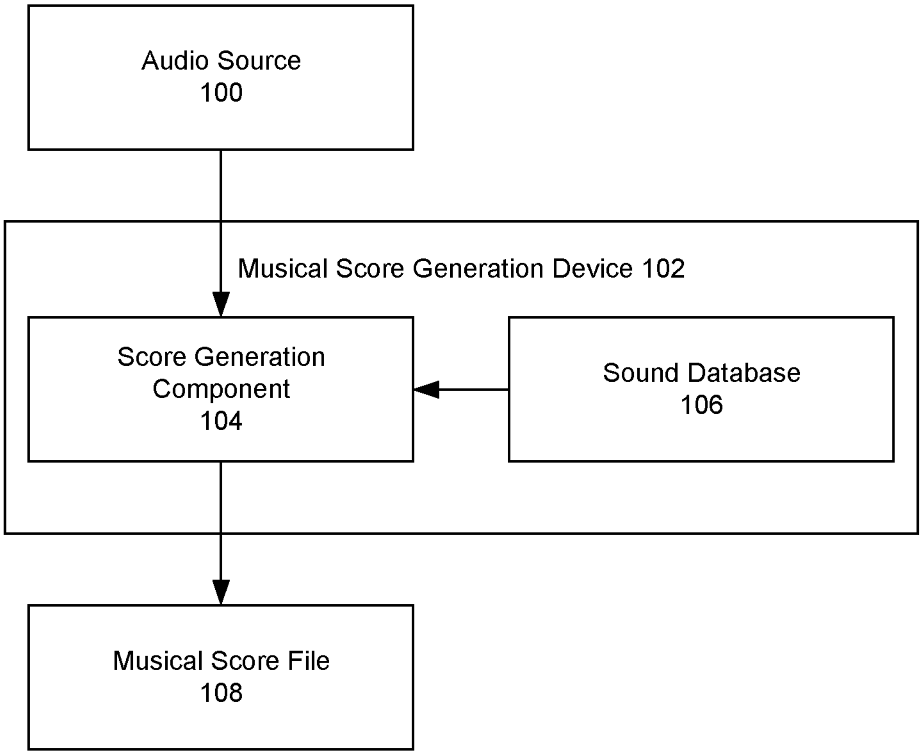
FIG. 1 depicts a musical score generation device receiving input audio from an audio source and generating a musical score file.

FIG. 1 depicts an audio source 100 providing input audio data to a musical score generation device 102. An audio source 100 can be a device that provides live or prerecorded audio data to the musical score generation device 102. The musical score generation device 102 can have a score generation component 104 running as software or firmware that uses data from a sound database 106 to convert the received audio data into a musical score file 108. The musical score file 108 can be printed or displayed as sheet music for human musicians, and/or can be followed by digital instruments to produce audible sounds through speakers.

An audio source 100 can provide live or prerecorded audio data to the musical score generation device 102 via a direct wired or wireless connection, a network connection, via removable storage, and/or through any other data transfer method. In some embodiments the audio source 100 and the musical score generation device 102 can be directly connected via a cable such as a USB cable, Firewire cable, digital audio cable, or analog audio cable. In other embodiments the audio source 100 and the musical score generation device 102 can both be connected to the same LAN (local area network) through a WiFi or Ethernet connection such that they can exchange data through the LAN. In still other embodiments the audio source 100 and the musical score generation device 102 can be directly connected via Bluetooth, NFC (near-field communication), or any other peer-to-peer (P2P) connection. In yet other embodiments the audio source 100 can be a cloud server, network storage, or any other device that is remote from the musical score generation device 102, and the audio source 100 can provide input audio data to the musical score generation device 102 remotely over an internet connection. In still further embodiments the audio source 100 can load input audio data onto an SD card, removable flash memory, a CD, a removable hard drive, or any other type of removable memory that can be accessed by the musical score generation device 102.

In some embodiments the audio source 100 can provide the audio data to the musical score generation device 102 as digital data, such as an encoded file or unencoded data. An encoded file can be a MIDI file, MP3 file, WAV file, or other audio file that includes encoded versions of sound data produced by a musical instrument or other source. Unencoded data can be electrical signals from a digital instrument that are captured by a device driver and then converted into musical sounds or notes. Such a device driver can be software or firmware at the audio source 100 or the musical score generation device 102. In some embodiments, if audio data originates as analog audio signals, the audio source 100 can convert the analog signals into digital data before sending it to the musical score generation device 102. In other embodiments the audio source 100 can provide analog audio signals to the musical score generation device 102, such that the musical score generation device 102 can then convert the analog audio signals to digital data.

In some embodiments the audio source 100 can be a musical instrument that can provide its audio output to the musical score generation device 102 while the instrument is being played, and/or that can record such audio output to digital or analog storage and later output the recorded audio data to the musical score generation device 102. By way of a non-limiting example, the audio source 100 can be a portable USB piano keyboard or organ.

In other embodiments the audio source 100 can be a microphone that can provide audio data to the musical score generation device 102 while it captures sound from its surrounding environment, and/or that can record such audio data to digital or analog storage and later output the recorded audio data to the musical score generation device 102. By way of non-limiting examples, a microphone can capture sounds: being played on a classical guitar or any other digital or analog musical instrument; human-produced sounds such as humming, whistling, or singing; sounds produced by tapping on objects or hitting objects together; animal sounds such as whines, meows, roars, or tweets; nature sounds such as a whistling sound produced by blowing wind; and/or any other sounds.

In still other embodiments the audio source 100 can be a device that can receive, store, and/or play back audio data from other sources, and that can output such audio data to the musical score generation device 102. By way of non-limiting examples, the audio source 100 can be a radio, MP3 player, CD player, audio tape player, computer, smartphone, tablet computer, or any other device.

The musical score generation device 102 can be a computing device that comprises or is connected to, at least one processor and at least one digital storage device. The processor can be a chip, circuit, or controller configured to execute instructions to direct the operations of the device running the musical score generation device 102, such as a central processing unit (CPU), application-specific integrated circuit (ASIC), field-programmable gate array (FPGA), graphics processing unit (GPU), or any other chip, circuit, or controller. The digital storage device can be internal, external, or remote digital memory, such as random access memory (RAM), read-only memory (ROM), electrically erasable programmable read-only memory (EEPROM), flash memory, a digital tape, a hard disk drive (HDD), a solid state drives (SSD), cloud storage, any/or any other type of volatile or non-volatile digital memory.

In some embodiments the musical score generation device 102 can be a printer, such as a standalone printer, multifunctional printer (MFP), fax machine, or other imaging device. In embodiments in which the musical score generation device 102 is a printer, the printer can directly print sheet music described by a musical score file 108 generated by the score generation component 104. In these embodiments the printer can print sheet music on a recording medium, such as paper, transparencies, or any other substrate or material upon which pages of sheet music can be printed. In other embodiments the musical score generation device 102 can be a computer, smartphone, tablet computer, microphone, voice recorder or other portable audio recording device, television or other display device, home theater equipment, set-top box, radio, portable MP3 player or other portable music player, or any other type of computing or audio-processing device.

As shown in FIG. 1, in some embodiments the audio source 100 and the musical score generation device 102 can be separate devices. In these embodiments the audio source 100 can provide input audio data to the musical score generation device 102 over a USB cable, audio cable, or other wired or wireless connection. By way of a non-limiting example, a microphone can provide captured audio data to a separate multifunctional printer (MFP), and the score generation component 104 can run as firmware installed on the MFP.

In alternate embodiments the audio source 100 can be a part of the musical score generation device 102, such that the audio source 100 directly provides input audio data to the score generation component 104 running on the same device. By way of a non-limiting example the musical score generation device 102 can be a microphone unit or a standalone portable audio recording device comprising a microphone, and the score generation component 104 can be firmware running in the microphone unit or recording device that can receive audio data captured by its microphone. By way of another non-limiting example the musical score generation device 102 can be a smartphone comprising a microphone and/or other audio inputs, and the score generation component 104 can be run as an application on the smartphone.

When the audio source 100 provides live or prerecorded audio data in real time over an audio cable or other connection, the musical score generation device 102 and/or score generation component 104 can digitally record and store the audio data in digital storage. By way of a non-limiting example, the score generation component 104 can encode the received audio data into an audio file, such as an MP3 file or an audio file encoded using any other lossless or compressed format. Similarly, when an audio source 100 provides audio data as an already encoded audio file, the musical score generation device 102 and/or score generation component 104 can store the received audio file in digital storage.

The score generation component 104 can be software or firmware that follows a set of instructions to generate one or more musical score files 108 from input audio data received from an audio source 100. As will be discussed further below, the score generation component 104 can detect and analyze individual musical and/or non-musical sounds present within the input audio data. The score generation component can then translate the detected sounds into a musical score files 108 for one or more target musical instruments, such that the musical score file 108 can be followed by musicians or by a digital media player to play music that corresponds to the input audio data. As such, the score generation component 104 can generate a musical score file 108 for one or more target instruments from sound data that originated from the same musical instruments, different musical instruments, and/or non-musical sources.

Figure 2:
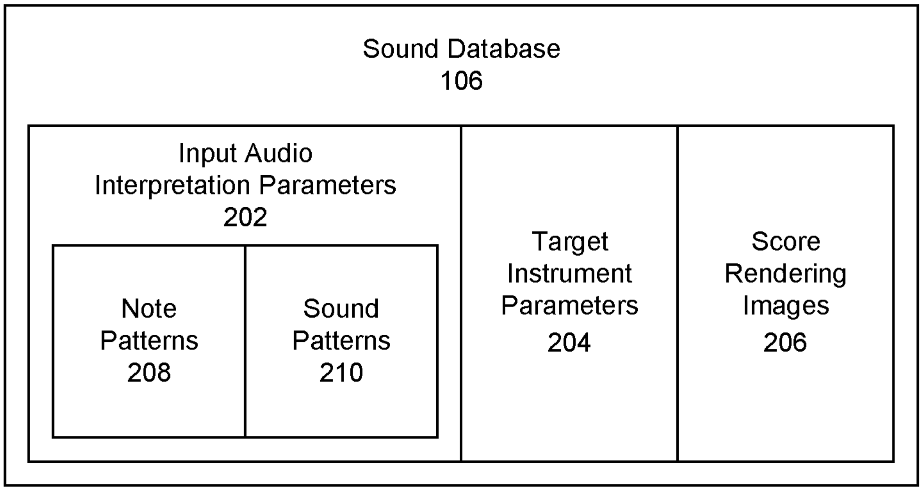
FIG. 2 depicts an exemplary embodiment of a sound database.

The sound database 106 can be a database of preloaded musical information that the score generation component 104 can use to interpret input audio data and generate a music score file 108 for one or more target musical instruments. As shown in FIG. 2, the sound database 106 can comprise input audio interpretation parameters 202, target instrument parameters 204, and score rendering images 206.

Input audio interpretation parameters 202 can include preloaded note patterns 208 and sound patterns 210. The score generation component 104 can use such patterns to identify notes and chords in input audio data produced by musical instruments or other non-musical instrument sources.

Note patterns 208 can be sound frequencies that identify notes and/or chords within sounds produced by musical instruments. Frequencies from note patterns 208 can be scalable, such that the score generation component 104 can scale note patterns 208 to compare them against input audio data to identify musical attributes of the input audio data, such as its octave, key, pitch, measure, and/or other attributes.

Sound patterns 210 can be sound frequencies that identify notes or tunes within sounds that were not produced by musical instruments, such as tapping, whistling, or humming sounds. Frequencies from sound patterns 210 can be scalable, such that the score generation component 104 can scale sound patterns 210 to find notes or tunes that substantially match the input audios. After notes or tunes in the input audio data are identified based on sound patterns 210, those notes or tunes can be compared against note patterns 208 to identify chords and/or note combinations as described above.

Target instrument parameters 204 can be data describing sounds produced by specific musical instruments, and/or data indicating how to produce such sounds. The sound database 106 can store different target instrument parameters 204 for different musical instruments.

Target instrument parameters 204 for a particular musical instrument can be frequencies or sound samples of musical notes and/or chords that can be produced by the musical instrument, information about beats or rhythms that the musical instrument can play, information about physical movements that can produce sound on the musical instrument, information about playing styles that can be used to produce sound on the musical instrument, instructions for playing the musical instrument in one or more playing styles, and/or information about other attributes, properties, or capabilities of the musical instrument.

By way of non-limiting examples, for a guitar the sound database 106 can store target instrument parameters 204 that identify strumming styles, strumming instructions, plucking styles, plucking instructions, finger picking styles, and/or finger picking instructions. For a flute or other wind instruments the sound database 106 can store target instrument parameters 204 that identify directions for blowing into the instrument, such as blowing inward or outward, and/or instructions for adjusting the strength of blown air. For a violin or other string instruments the sound database 106 can store target instrument parameters 204 that identify instructions for the direction of bow movements, instructions for the length of bow strokes, and/or instructions for finger picking styles. For a drum set or other percussion instruments the sound database 106 can store target instrument parameters 204 that identify drum beat patterns and instructions for playing base drum, cymbals, snare drums, and/or other drum set components.

The score generator component 104 can use target instrument parameters 204 to generate a music score file 108 for one or more selected target musical instruments based on how the selected target musical instruments would play notes, chords and/or note combinations that were identified by the score generator component 104 using input audio interpretation parameters 202. By way of a non-limiting example, when a user selects a violin as a target musical instrument, the score generator component 104 can identify notes, chords and/or note combinations in the input audio data and then generate a music score file 108 that expresses instructions for playing the identified notes, chords and/or note combinations with a violin, including symbols that specify upward or downward bow movement for specific identified notes and/or an indication of a specific finger picking style.

In some embodiments information in the sound database 106 for percussion or rhythm instruments can indicate a beat or rhythm, and/or how to play that beat or rhythm, instead of information about individual notes or chords. By way of non-limiting examples, target instrument parameters 204 for drums, tambourines, maracas, bells, cymbals, and other percussion instruments can include information about rhythms or beat patterns for cha-cha, waltz, salsa, tango, rock, jazz, samba, and other types of music.

Score rendering images 206 can be images that depict musical symbols, such as notes, rest symbols, accidentals, breaks, staffs, bars, brackets, braces, clefs, key signatures, time signatures, note relationships, dynamics, articulation marks, note ornaments, repetition and coda symbols, octave signs, and/or any other symbols, such as instrument-specific notations. In some embodiments the sound database 106 can store different versions of such musical symbols in different styles or themes, including font styles, line styles, and note styles. By way of a non-limiting example, different themes can describe sets of font, line, and/or note styles, as different musical communities can prefer different styles for their sheet music. The sound database 106 can store score rendering images 206 as bitmaps or files in any other image file format. The score generator component 104 can use score rendering images 206 from the sound database 106 when generating and/or printing a music score file 108.

In some embodiments the sound database 108 can also include additional types of sound samples and/or sound information. By way of non-limiting examples, the sound database 108 can store samples of electronically generated sounds for electronica music, samples of hip-hop or rap music, samples of beat box or voice effects, or any other type of sound data.

Musical score files 108 generated by the score generation component 104 can be binary files that represent musical data for one or more target musical instruments. In some embodiments the score generation component 104 can create one musical score file 108 for each selected target musical instrument, while in other embodiments the score generation component 104 can create a single musical score file 108 that includes data for multiple target musical instruments.

A musical score file 108 can comprise a page description header 302 that indicates how the musical score file 108 can be printed into sheet music, a musical instrument information section 304 that identifies target musical instruments for which the musical score file 108 has musical data, and one or more sections of musical score data 306 that represents how individual target musical instruments can produce musical sounds that correspond to original input audio data received from the audio source 100. By way of a non-limiting example, FIG. 3A depicts an exemplary embodiment of a format for a musical score file 108 that comprises a page description header 302, a musical instrument information section 304, and musical score data 306.

FIG. 3B depicts a non-limiting exemplary embodiment of a format for a page description header 302 within a musical score file 108. A page description header 302 can define page settings that a printer can use to print pages of sheet music according to the musical score file 108, such as media information, font information, color information, layout information, line style information, and/or finishing options. In some embodiments a page description header 302 can be represented within musical score file 108 using a page description language (PDL) that can be parsed and interpreted by a printer, such as PostScript, PCL (Printer Command Language), PDF (Portable Document Format), or XPS (XML Paper Specification). By way of a non-limiting example, as will be discussed below a printer or other device can have a musical score page description language (PDL) raster image processor (RIP) 400 that can interpret PDL commands or other information in a page description header 302 to set up printing of sheet music according to a musical score file 108.

Media information can indicate a size and/or a type of recording medium that a printer should use when printing pages of sheet music according to the musical score file 108. By way of non-limiting examples, the media information can specific that sheet music pages should be printed on standard paper, glossy paper, transparencies, or any other type of recording medium at a specific size, such as standard letter size sheets of paper.

Font information can indicate a font name, font size, font style such as bold or italics, font color, and/or any other information about fonts that a printer should use when printing pages of sheet music according to the musical score file 108. In some embodiments the font information can reference standard font data stored at the printer. In other embodiments score rendering images 206 from the sound database 106 associated with fonts can be embedded in the musical score file 108.

Color information can indicate a foreground color, background color, transparency settings, and/or any other information about the color of one or more elements to be printed on pages of sheet music according to the musical score file 108.

Layout information can indicate to a printer how to arrange pages of sheet music for printing on pieces of paper or another recording medium according to the musical score file 108. By way of non-limiting examples layout information can identify the orientation of pages in a portrait or landscape orientation, a feeding edge to use during printing, the number of pages (NUP) of sheet music that should be printed on a single sheet of paper, duplex options indicating whether or not pages should be printed on one or both sides of a sheet of paper, and/or binding options indicating whether printed sheets should be bound together.

Line style information can indicate to a printer how to print lines on pages of sheet music according to the musical score file 108, including how thick to print the lines and/or a line style such as solid or dashed.

Finishing options can indicate to a printer whether or not printed pages of sheet music should be stapled, hole punched, and/or finished in any other way according to the musical score file 108.

By way of a non-limiting example, FIG. 3C depicts a page description header 302 that can be present within a musical score file 108 to indicate to a printer that it should print pages of sheet music according to the music score file 108 on standard letter-sized paper with text rendered using the Times New Roman font at size 12, that elements in the foreground should be printed in cyan while elements in the background should be printed in gray, that elements are to be printed as opaque without transparency, that the pages are not set to be stapled, and that the printer should punch two holes on the left side of each page.

While FIG. 3C depicts values for each field of the page description header 302 in clear text, in alternate embodiments the page description header 302 can be expressed with keyword-value pairs with values expressed as coded identifiers or numeric values that are known to the score generation component 104 and to a musical score PDL RIP 400 that interprets the page description header 302 at a printer.

In some embodiments a page description header 302 can indicate default print settings for printing sheet music with a printer according to the musical score file 108, but the printer can have a settings menu through which users can modify the default print settings individually and/or by selecting a preset or user-defined theme. In other embodiments a printer can override user-set print settings and follow the print settings indicated by a page description header 302 when printing sheet music according to a musical score file 108.

FIG. 3D depicts a non-limiting exemplary embodiment of a format for a musical instrument information section 304 within a musical score file 108. A musical score file 108 can identify one or more musical instruments that has musical score data 306 represented in the musical score file 108. By way of a non-limiting example, when the score generation component 104 generates a musical score file 108 for target instruments including a guitar and a piano, the musical instrument information section 304 can indicate that the musical score file 108 contains musical score data 306 for a guitar and a piano.

The musical instrument information section 304 can indicate an identifier for each musical instrument that has musical score data 306 in the musical score file 108, such as an identification number, a keyword, or the clear text name of the instrument. The musical instrument information section 304 can also indicate an offset value for each identified musical instrument that indicates the starting location within the musical score file 108 for musical score data 306 associated with that instrument. The offset values can be represented as a relative or absolute file position address. By way of a non-limiting example, when the musical instrument information section 304 identifies two instruments, an offset for the first instrument can indicate that musical score data 306 for the first instrument begins at byte X within the musical score file 108, while an offset for the second instrument can indicate that musical score data 306 for the second instrument begins at byte Y within the musical score file 108.

FIG. 3E depicts a non-limiting exemplary embodiment of a format for musical score data 306 within a musical score file 108. The musical score file 108 can have one or more sections of musical score data 306, with one section for each musical instrument identified in the musical instrument information section 304. Each section can contain a series of musical score data 306 elements for the associated musical instrument.

For each identified musical instrument, the musical score file 108 can have musical score data 306 for each note or sound that can be produced by that musical instrument according to the musical score file 108. Musical score data 306 can be binary, encoded, compressed, and/or secured data that indicates how to produce each note or sound. Such data can correspond to target instrument parameters 204 identified by the score generation component 104 for the musical instrument.

As shown in FIG. 3E, in some embodiments a musical score data 306 element can identify a particular note or chord, a key or octave in which to play the identified note or chord, a number of measures or a length of time to play the note or chord, a playback instruction for how to play the note or chord, and/or an indication of when to begin playing the note or chord. Playback instructions can indicate a playing style, such as identifying strumming or finger picking for a guitar, whether notes should be played louder or softer than previous notes, or other information corresponding to identified target instrument parameters 204. By way of a non-limiting example, musical score data 306 for a piano can identify a D note, specify that the note is to be played in the key of C, that the note should be played for half a measure, that the note should be played louder than the previous note, and that the note should start to be played at 30 seconds into the song. In other embodiments musical score data 306 can identify additional and/or alternate data, such as symbols, notations, or instructions that are particular to specific musical instruments. In some embodiments musical score data 306 for percussion or rhythm instruments can indicate a beat or rhythm, and/or how to play that beat or rhythm, instead of information about individual notes or chords.

In some embodiments a musical score file 108 can further comprise fields for additional data, such as a file type identifier, a major version number, a minor version number, file trailer data, and/or file content information as shown in FIG. 3A.

The file type identifier field can identify that the file is a music score file 108. By way of a non-limiting example, in some embodiments setting the file type field to "0x50504d53" can indicate that the file is a music score file 108. As such, when the file type identifier field has a specific value that has been associated with music score files 108, devices processing the file can determine that it is a music score file 108 instead of a file with a different file format such as MP3, ZIP, XPS, WAV, MP4, AVI, MOV, or other file format. By way of non-limiting examples, devices such as musical score generation devices 102 or separate printers or media score media players 500 can use the file type identifier field's value to determine that a file provided to the device is a music score file 108.

The major and minor version number fields can identify a version or revision number associated with the musical score file 108.

File trailer data can include one or more optional fields that identify security codes, CRC, user information, location information, and/or any other information.

File content information can include an offset table that indicates the relative or absolute file position addresses of other sections of the musical score file 108, such as the page description header 302, musical instrument information section 304, musical score data 306 sections, and/or file trailer data.

Although FIGS. 3A and 3E indicate data types and sizes for different files within a musical score file 108 and musical score data 306, these figures show only one non-limiting exemplary embodiment of a file format. In other embodiments the musical score file 108 can represent data in any other format with fields having any other data type and/or size. By way of a non-limiting example, information about a note, chord, or beat can be represented with more than one byte in embodiments in which the associated target musical instrument can output more distinct sounds than can be identified with one byte. Additionally, in other embodiments the musical score file 108 can have additional and/or alternate fields, such as fields for identifying localization information for musical information specific to certain geographic areas or languages, theme data that identifies a particular style for fonts, colors, and/or other attributes rather than setting those attributes directly, and/or any other type of field.

Figure 4:
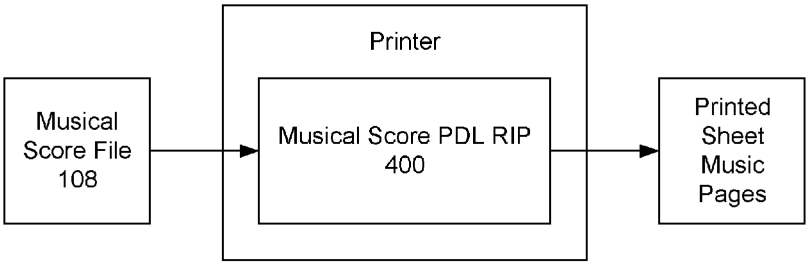
FIG. 4 depicts a printer printing pages of sheet music based on a musical score file using a musical score page description language (PDL) raster image processor (RIP).

FIG. 4 depicts a printer printing pages of sheet music based on a musical score file 108. A printer can comprise a musical score page description language (PDL) raster image processor (RIP) 400. The musical score PDL RIP 400 can be a software or firmware component running on the printer that can interpret PDL instructions in the page description header 302 and/or sections of musical score data 306 in a musical score file 108 to render pages of sheet music that can be printed by the printer. By way of non-limiting examples the musical score PDL RIP 400 can follow PDL commands in a page description header 302 to set up the appearance of a page of sheet music, and follow PDL commands in musical score data 306 for a particular instrument to render notes and other musical symbols on that page.

As described above, in some embodiments the musical score generation device 102 can be a printer, and as such in these embodiments the musical score generation device 102 can comprise a musical score PDL RIP 400 such that it can directly print sheet music pages based on a musical score file 108 that it generates from sound data received from an audio source 100. In other embodiments a musical score generation device 102 can generate a musical score file 108 and the musical score file 108 can be provided to a separate printer that comprises a musical score PDL RIP 400 in order to print sheet music pages described by the musical score file 108.

In alternate embodiments a musical score PDL RIP 400 running on a computer, television, or any other device can generate images of pages of sheet music based on a musical score file 108. Such images can then be displayed on a screen, and/or be transferred to other devices for display or printing. By way of a non-limiting example, a musical score PDL RIP 400 can produce images of sheet music pages based on PDL instructions in a musical score file 108, such that the sheet music images can be displayed to a musician on a television or computer monitor. By way of another non-limiting example, a musical score PDL RIP 400 on one device can produce images of sheet music pages from a musical score file 108, and the sheet music images can then be transferred to other devices or be printed by a printer that does not have a musical score PDL RIP 400.

In some embodiments a musical score PDL RIP 400 can be set to prepare pages of sheet music for a specific target instrument identified in the musical instrument information section 304 of a musical score file 108. In other embodiments a musical score PDL RIP 400 can be set to prepare pages of sheet music for more than one target instrument identified in a musical score file 108.

Figure 5:
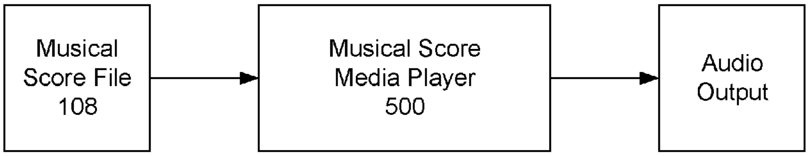
FIG. 5 depicts a musical score media player producing audible sounds based on a musical score file.

FIG. 5 depicts a musical score media player 500 producing audible sounds based on a musical score file 108. In some embodiments a musical score media player 500 can be software or firmware running on a device that comprises speakers or that otherwise can output sound signals to speakers for playback, such that the device can play sounds generated by the musical score media player 500 on the speakers. By way of non-limiting examples, a musical score media player 500 can run on a television, set-top box, stereo system, MP3 player, computer, smartphone, tablet computer, or any other device with speakers.

In alternate embodiments a musical score media player 500 can process a musical score file 108 and save the generated sounds as an encoded audio file, such as an MP3 file or a file in any other audio file format. In these embodiments the encoded audio file can be burned to a CD or be stored for later playback on the same or a different device, such as a device that does not have a musical score media player 500.

The musical score media player 500 can follow the musical score data 306 for one or more instruments identified in the musical instruments information section 304 of a musical score file 108 to generate sounds in accordance with the musical score data 306. In some embodiments the musical score media player 500 can have access to prerecorded audio samples for each musical instrument that can be referenced by a musical score file 108. By way of a non-limiting example, in some embodiments a musical score media player 500 can access a sound database 106 to obtain audio samples for an instrument. In other embodiments a musical score media player 500 can be preloaded with audio samples or access audio samples from any other database or source. In alternate embodiments the musical score media player 500 can digitally simulate the sound output of each instrument by a musical score file 108 using frequencies associated with notes and sounds that can be output by particular instruments.

A musical score media player 500 can arrange audio samples or simulated sounds into a song as indicated by the musical score data 306. By way of a non-limiting example, the musical score media player 500 can have prerecorded audio samples of each note that can be played by a saxophone, and/or samples of each note played in different styles. As such, the musical score media player 500 can follow the note information, playing style information, timing information, and other information identified in each piece of musical score data 306 for one or more instruments to assemble the prerecorded audio samples into audio data that can be played over speakers as a song. When the musical score file 108 references multiple instruments, the musical score data 306 can assemble and mix together prerecorded or generated audio samples for each instrument to generate a song.

As described above, in some embodiments the musical score generation device 102 can comprise a screen or be connected to a screen. In these embodiments the musical score generation device 102 can have a display component such that it can display musical score data 306 from a musical score file 108 on the screen. In some embodiments the musical score generation device 106 can also have or be connected to speakers. In these embodiments the musical score generation device 102 can have sound output component such that it can generate audio from the musical score file 108 as a musical score media player 500 and play the audio over the speakers. In some embodiments the musical score generation device 102 can display musical score data 306 on screen while simultaneously playing the corresponding audio over speakers. In alternate embodiments a separate musical score media player 500 can be provided with a musical score file 108 generated by a different musical score generation device 102, and the musical score media player 500 can display musical score data 306 from the musical score file 108 on a screen and/or generate and play corresponding audio over speakers.

Figure 6:
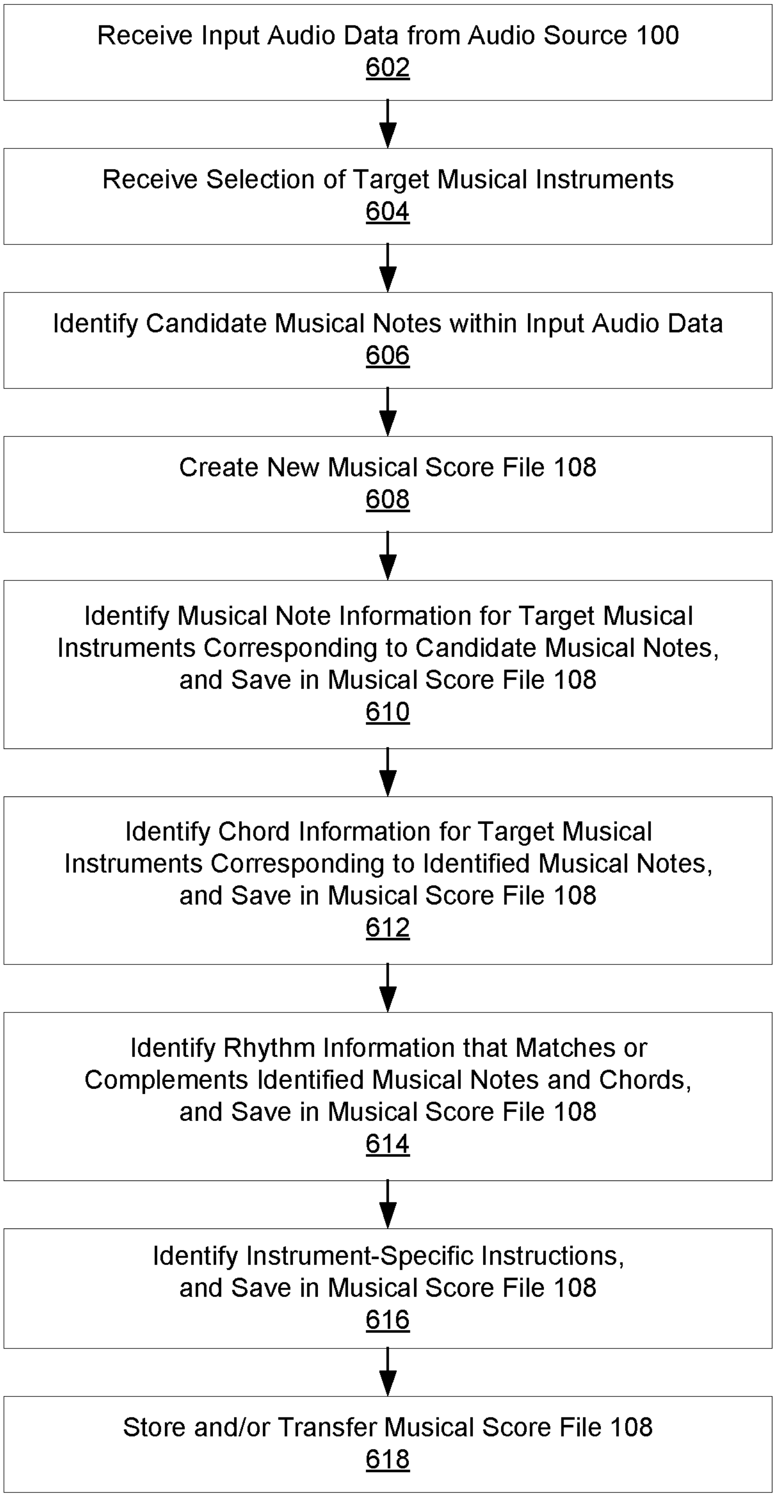
FIG. 6 depicts an exemplary embodiment of a process for generating a musical score file with a score generation component.

FIG. 6 depicts an exemplary embodiment of a process for generating a musical score file 108 with a score generation component 104.

At step 602, an audio source 100 can provide input audio data to the musical score generation device 102. As described above the input audio data can be live or prerecorded sounds, such as music or non-musical sounds. If the input audio data is provided in an analog format, the musical score generation device 102 and/or score generation component 104 can convert the analog audio to digital audio using a device driver, software utility, or other processing component. Similarly, if the input audio data is provided as an un-encoded raw digital audio signal, the musical score generation device 102 and/or score generation component 104 can convert it into an encoded digital audio file.

At step 604, a user can select one or more target musical instruments at the score generation component 104, such that the score generation component 104 can produce a musical score file 108 for the selected instruments based on the input audio data received during step 602. By way of a non-limiting example, the musical score generation device 102 can display a user interface through which users can input commands to select one or more target instruments for the score generation component 104. In some embodiments selectable target musical instruments can be instruments for which sound data is stored in the sound database 106. In some embodiments the score generation component 104 can use a default set of target instruments preset by the audio source 100 or musical score generation device 102 absent instructions from a user to select specific target musical instruments during step 604.

The target musical instruments selected during step 604 can be the same as or different from a musical instrument that generated the input audio data. By way of a non-limiting example, a user can record a music composition played on a guitar as input audio data, but select a piano as a target musical instrument during step 604 in order to produce a musical score file 108 for pianos that corresponds to the recorded guitar music.

At step 606, the score generation component 104 can identify candidate musical notes within the input audio data. In some embodiments the score generation component 104 can perform a frequency and/or volume level analysis to divide the input audio data into segments that share substantially the same sound frequency. Adjacent segments of the input audio data that have distinct frequencies, such as frequencies that differ by a predetermined amount or percentage, and/or that are separated by periods of silence can be considered as distinctive sound signals. As such, the score generation component 104 can identify candidate musical notes within the input audio data as segments that have distinctive sound signals. In some embodiments the score generation component 104 can use digital filtering, noise elimination, or other processing steps to clean the input audio data prior to identifying candidate musical notes, such as eliminating background noise and/or static.

In embodiments in which the input audio already identified individual notes produced by a musical instrument, the score generation component 104 can use that note information to directly identify candidate musical notes without a frequency and/or volume analysis. By way of a non-limiting example, a digital instrument such as a digital piano keyboard can output a MIDI file or other file type that identifies discrete notes that were played on the instrument.

At step 608, the score generation component 104 can create a new musical score file 108. The score generation component 104 can initialize the musical score file 108 with a page description header 302 that identifies page settings that a printer can use to print pages of sheet music according to the musical score file 108. The score generation component 104 can also add a musical instrument information section 304 that identifies the target musical instruments selected during step 604, and initialize musical score data sections 306 for each target musical instrument. In some embodiments the score generation component 104 can open the new musical score file 108 as a file stream such that it can add to the musical score data sections 306 for each target musical instrument as the following steps are performed to identify notes, chords, rhythms, and/or instrument-specific instructions for the input audio data. When data is added to one or more musical score data sections 306, the score generation component 104 can update offset values in the musical instrument information section 304 to identify the beginning of the musical score data section 306 associated with each target instrument in the file stream.

At step 610, the score generation component 104 can use the sound database 106 to identify musical notes that best correspond to the candidate musical notes. The score generation component 104 can use information in note patterns 208, sound patterns 210, and/or target instrument parameters 204 for the target instruments selected during step 604 to identify which musical note most closely matches the candidate musical note segment. In some embodiments the score generation component 104 can compare frequencies of a candidate musical note segment against frequencies in the sound database 106 to identify the closest musical note. The score generation component can also adjust the candidate musical note's sound signals to find a closer match in the sound database 106, such as scaling the candidate musical note to a different key or octave, changing its pitch, speeding it up or slowing it down, changing its volume level, and/or any other adjustment or modulation. The score generation component 104 can add information about each identified note to the musical score data section 306 associated with the target instrument.

At step 612, the score generation component 104 can use the sound database 106 to identify musical chords that best correspond to consecutive and/or overlapping musical notes that were identified during step 608. The score generation component 104 can compare arrangements of identified notes against note patterns 208 and/or target instrument parameters 204 in the sound database 106 to find a chord for the target instrument that most closely matches that arrangement of notes. In some embodiments the score generation component 104 can compare frequencies of a candidate series of identified notes against chord information in the sound database 106 to identify the closest chord for that candidate series of identified notes. The score generation component can also adjust the sound signals of the candidate series of identified notes to find a closer match in the sound database 106, such as scaling the notes to a different key or octave, changing their pitch, speeding them up or slowing them down, changing their volume level, and/or any other adjustment or modulation. In some embodiments the score generation component 104 can attempt to find a chord for different candidate series of identified notes, such as candidate series with different starting and ending points, and it can use a chord that is the best match for one of the candidate series of identified notes. The score generation component 104 can add information about each identified chord to the musical score data section 306 associated with the target instrument At step 614, the score generation component 104 can identify rhythm information about the input audio data based on a grouping of one or more identified notes and/or chords. In some embodiments the score generation component 104 can use the timing of the identified notes and/or chords relative to one another and/or the frequencies of the identified notes and/or chords relative to one another to identify a musical melody or tune, and then use such timing and/or melody information to identify a rhythm in the sound database 108 that matches or complements the input audio data. The rhythm can indicate a beat pattern or tempo that can be played by drums, percussion, or other instruments as an accompaniment to other musical instruments. In other embodiments the score generation component 104 can directly compare identified note or chord patterns against rhythm information in the sound database 108 to find a best match for the identified note or chord patterns. The score generation component 104 can add information about each identified rhythm to the musical score data section 306 associated with the target instrument, and/or add identified rhythm information to a new musical score data section 306 for an accompanying instrument in addition to a selected target instrument. By way of a non-limiting example, when the target instrument is a guitar but the score generation component 104 finds a rhythm pattern suitable for a drum that can be played along with the guitar, the score generation component 104 can add rhythm information for the drum to the musical score file 108 in addition to note or chord information for the guitar. In some embodiments step 614 can be skipped if drums or another accompanying instrument were not selected as target musical instruments during step 604.

At step 616, the score generation component 104 can use target instrument parameters 204 to identify instrument-specific instructions for how to play back the musical notes, chords, and/or rhythm information identified during steps 608-614 using the target musical instruments selected during step 604. By way of a non-limiting example, instrument-specific instructions can indicate upward or downward movement of a violin bow for a particular note. The score generation component 104 can add information about each identified instrument-specific instruction to the musical score data section 306 associated with the target instrument. In some embodiments or situations, instrument-specific notations can be added to the musical score data section 306 or page description header 302 based on score rendering images 206.

At step 618, after creating and finalizing a musical score file 108 based on the candidate musical notes found within input audio data, the musical score file 108 can be stored in memory at the musical score generation device 102 and/or transmitted to another device via a wireless connection, wired connection, or removable media. The musical score file 108 can then be used to print or display pages of sheet music for one or more of the target instruments selected during step 604 via a musical score PDL RIP 400, and/or to digitally generate and play back music over speakers via a musical score media player 500.

In some embodiments or situations more than one piece of input audio data can be provided to a score generation component 104, such that the score generation component 104 can create a musical score file 108 based on multiple pieces of input audio data. By way of a non-limiting example, the score generation component 104 can be configured to generate musical score data 306 for one set of target musical instruments based on a first piece of input audio data, and to generate musical score data 306 for another set of target musical instruments based on a second piece of input audio data. Although in this situation the musical score data 306 for different target instruments can be based on different pieces of input audio data, the target instruments can be listed in the musical instruments information section 304 with offsets that point to their respective musical score data 306 sections within the same musical score file 108.

Similarly, in some embodiments the score generation component 104 can create a musical score file 108 from combinations of existing musical score files 108 and/or combinations of existing musical score files 108 and new pieces of input audio data. By way of a non-limiting example, a score generation component 104 can import two musical score files 108 and combine their information into a new musical score file 108. By way of another non-limiting example, a score generation component 104 can import an existing musical score file 108 and a piece of input audio data, and create a new musical score file 108 that combines data from the existing musical score file 108 with new data transcribed from the new input audio data.

Figure 7:
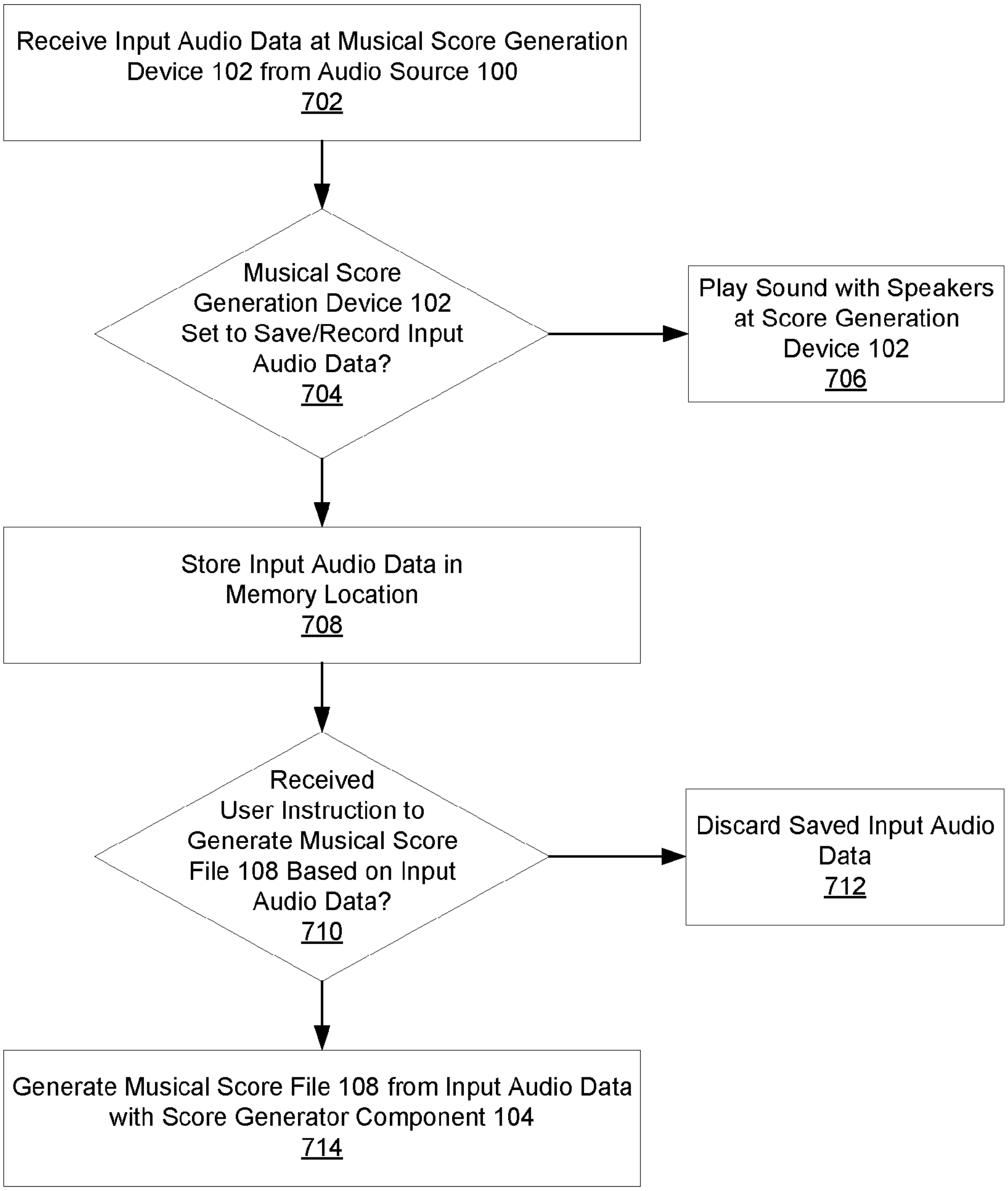
FIG. 7 depicts an exemplary process through which a user can listen to input audio data via a musical score generation device and then choose to either discard the input audio data or activate the score generation component to generate a musical score file.

In some embodiments a musical score generation device 102 can allow a user to hear and/or edit input audio data before the score generation component 104 converts the input audio data into a musical score file 108. By way of a non-limiting example, FIG. 7 depicts an exemplary process through which a user can listen to input audio data via a musical score generation device 102 and then choose to either discard the input audio data or activate the score generation component 104 to generate a musical score file 108.

At step 702, the musical score generation device 102 can receive live or prerecorded input audio data from an audio source 100 as described above.

At step 704, the musical score generation device 102 can determine whether it has been set to save or record the received input audio data. If it has not been set to save or record the input audio data, it can play back the input audio data using integrated or connected speakers at step 706 and the process can end. However, if it has been set to save or record the input audio data, the musical score generation device 102 can move to step 708 and store the input audio data at a memory location, such as in RAM or on a hard drive.

At step 710, the musical score generation device 102 can determine whether it has received a user instruction to generate a musical score file 108 based on the input audio data. In some embodiments, after saving the received input audio data at a memory location, the musical score generation device 102 can play back the input audio data over speakers for a user's review. The user can thus listen to the input audio data and determine whether or not they want to proceed with using it to create a musical score file 108. In some embodiments the user can optionally edit the input audio data via audio processing applications on the musical score generation device 102. By way of non-limiting examples, a user can edit the input audio data by truncating audio segments, reversing audio signals, copying audio segments, re-ordering audio segments, importing and/or exporting audio segments, applying sound effects or filters, adjusting volume levels, mixing multiple pieces of input audio data, and/or performing any other audio editing operation.

In some embodiments when the user chooses not to proceed with creating a musical score file 108 based on the input audio data at step 710, the input audio data can be discarded by the musical score generation device 102 at step 712. By way of a non-limiting example, the input audio data can be temporarily stored in RAM during step 708 and then removed from RAM at step 712. In other embodiments the input audio data can be stored in a directory on a hard drive or other storage if a user chooses not to proceed with generating a musical score file 108 at step 710, such that it can be loaded at a later time for further review and/or editing by a user before it is then saved, deleted, or used to create a musical score file 108.

If at step 710 a user does choose to proceed with creating a musical score file 108 based on the input audio data, the musical score generation device 102 can move to step 714 and activate the score generation component 104 and follow the process of FIG. 6 to generate a musical score file 108 corresponding to the input audio data.

The process of FIG. 7 can allow a user to review recorded sounds before creating a musical score file 108. By way of a non-limiting example, a musician can compose music by playing it on a guitar, recording the music, and providing the recorded music to the musical score generation device 102 at step 702. The musician can then play back and/or edit the recorded guitar music with the musical score generation device 102. If the musician decides he does not like the recorded composition and wants to try again, the recorded music can be deleted from the musical score generation device 102 at step 706 and the musician can record another composition. However, if the musician does decide he likes the recorded composition and wants to convert it into a musical score file 108, the score generation component 104 can be activated at step 714 and the musician can select target musical instruments for which the musical score file 108 will be created using the process of FIG. 6.

Figure 8:
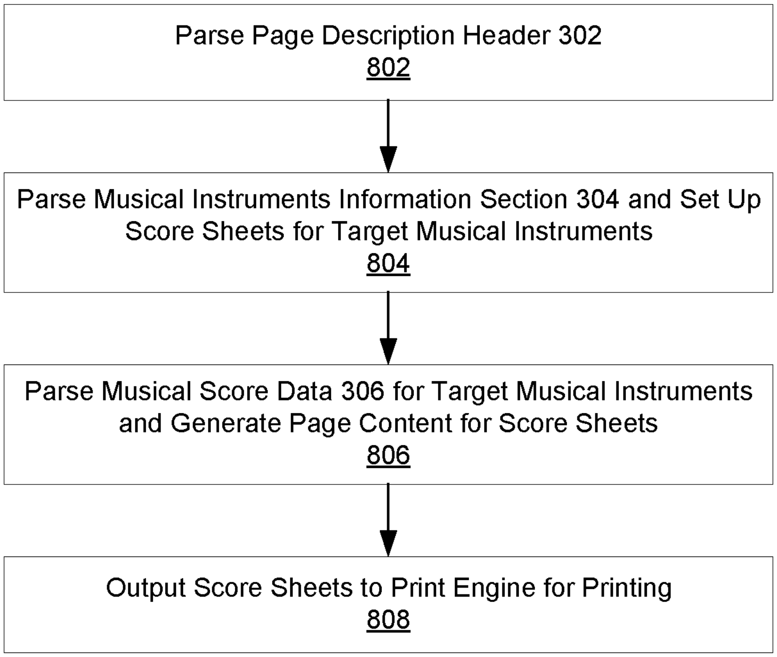
FIG. 8 depicts an exemplary process for preparing pages of sheet music for printing with a musical score PDL RIP at a printer based on a musical score file.

FIG. 8 depicts an exemplary process for preparing pages of sheet music for printing with a musical score PDL RIP 400 at a printer based on a musical score file 108.

At step 802, the musical score PDL RIP 400 can parse the page description header 302 within the musical score file 108. The musical score PDL RIP 400 can parse and interpret page description language (PDL) commands or other substantially similar commands in the page description header 302 to identify themes, fonts, colors, and other page content properties for printing sheet music pages.

At step 804, the musical score PDL RIP 400 can parse the musical instrument information section 304 within the musical score file 108 to create and set up a separate score sheet for each different target musical instrument identified in the musical instrument information section 304. In some embodiments a user can input commands into the printer to specify that sheet music pages should be printed for one or more specific target musical instruments, and as such the musical score PDL RIP 400 can set up a score sheet for those selected target musical instruments. In other embodiments the musical score PDL RIP 400 can set up score sheets for all target musical instruments identified in the musical instrument information section 304. Each score sheet can be set up according to parameters identified in the page description header 302 during step 802. By way of non-limiting examples, the page description header 302 can indicate a paper selection, an orientation, layout information, font style, musical note styling, and/or other information about how to print pages.

At step 806, the musical score PDL RIP 400 can parse musical score data 306 to generate page content for each score sheet. For each selected target musical instrument, the musical score PDL RIP 400 can iterate through each piece of musical score data 306 associated with that target musical instrument. The musical score PDL RIP 400 can generate and/or arrange notations on the target musical instrument's score sheet that represent notes, chords, beats, and/or other musical information according to the musical score data 306. By way of a non-limiting example, when the musical score file 108 includes musical score data 306 for five successive notes, the musical score PDL RIP 400 can place notations for those five musical notes on a musical staff based on information in the musical score data 306, including the identity of each note, how long it is to be played, when it is to be played, and/or other musical attributes. The notations used by the musical score PDL RIP 400 while generating page content can be based on themes, fonts, colors, or other styles or instrument-specific notations identified in the page description header 302 or musical score data 306. In some embodiments the musical score PDL RIP 400 can retrieve identified symbols, fonts, or themes from score rendering images 206 at a sound database 106 if it does not already have a copy of those assets.

At step 808, the musical score PDL RIP 400 can output the generated score sheets to a printer's print engine to be printed onto paper or another recording medium. In alternate embodiments a device driver or other component can convert the generated score sheets into an image file that can be displayed on a screen, transferred to another device, and/or be printed at a later time.

Figure 9:
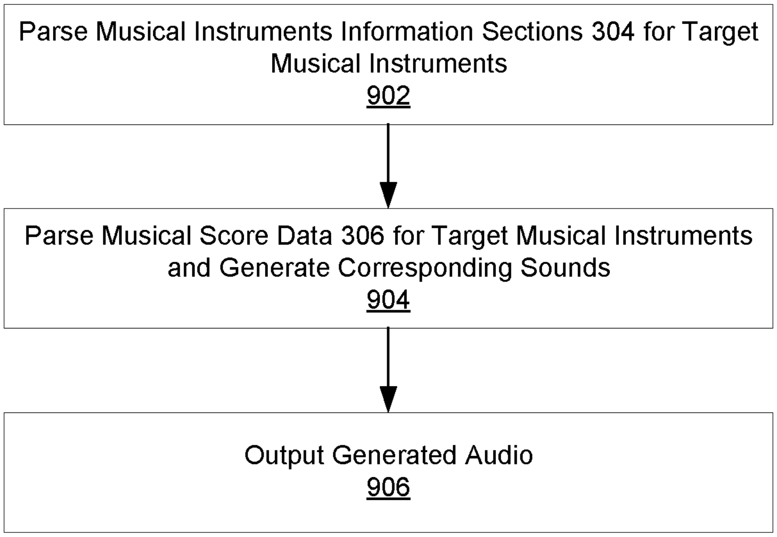
FIG. 9 depicts an exemplary process for digitally generating audible music from a musical score file using a musical score media player.

FIG. 9 depicts an exemplary process for digitally generating audible music from a musical score file 108 using a musical score media player 500. The generated audible music can be played back over speakers and/or stored as an encoded audio file. In some embodiments the musical score media player 500 can ignore the page description header 302 within the musical score file 108 when generating audible music.

At step 902, the musical score media player 500 can parse the musical instrument information section 304 to identify the target musical instruments for which data exists in the musical score file 108. In some embodiments a user can input commands into the musical score media player 500 to specify that the musical score media player 500 should generate music using one or more specific target musical instruments. In other embodiments the musical score media player 500 can generate music using all target musical instruments identified in the musical instrument information section 304.

At step 904, the musical score media player 500 can parse musical score data 306 to generate sounds for each selected target musical instrument. The musical score media player 500 can use prerecorded sound samples and/or synthesized audio output to generate musical sounds according to each piece of musical score data 306. Such prerecorded sound samples and/or parameters for generating synthesized audio output can be stored in memory at the device running the musical score media player 500 or be stored at a sound database 106 that is locally or remotely accessible by the musical score media player 500. In some embodiments the musical score media player 500 can follow the notes, chords, beats, instrument-specific notations, and/or other musical information identified in a piece of musical score data 306 to identify a prerecorded sound sample that most closely matches those parameters. In other embodiments the musical score media player 500 can follow musical information identified in a piece of musical score data 306 to generate synthesized musical sounds that correspond to the parameters.

At step 906, the musical score media player 500 can output the audio generated from prerecorded or synthesized musical sounds for the selected target musical instruments during step 804 as an audio signal to be played back on speakers and/or recorded for later playback. In alternate embodiments the musical score media player 500 can encode the audio generated during step 804 into an audio file, such as an MP3 or file in any other audio format, such that the audio file can be stored and/or transferred to other devices.

In some embodiments the musical score media player 500 can use multi-threaded processes to generate audio for different target musical instruments substantially simultaneously. In these embodiments the musical score media player 500 can launch a separate thread process for each selected target musical instrument, such that each thread process can generate audio for the associated musical instrument based on its musical score data 306. The musical score media player 500 can mix together audio generated by different thread for different target musical instrument processes when it outputs sound to speakers or when it saves the generated audio to an encoded audio file. By way of a non-limiting example, a musical score media player 500 can use multi-threading to generate and output sound for a plurality of selected target instruments according to a music score file 108, such that a listener hears an orchestra of different instruments playing the music.

In some embodiments a device can have both a musical score PDL RIP 400 and a musical score media player 500, such that it can perform either or both of the processes shown in FIGS. 8 and 9. By way of a non-limiting example, a printer can have both a musical score PDL RIP 400 and a musical score media player 500, such that it can be set to print pages of sheet music and/or generate and play audible music when the printer loads a musical score file 108.

As described above, the score generation component 104 can create a musical score file 108 based on one or more pieces of input sound data. As such, a user can input a musical tune recorded on one instrument and have the score generation component 104 create a musical score file 108 for multiple target musical instruments, such that it can be printed as sheet music for those target musical instruments via a musical score PDL RIP 400 or be played back as audible music based on those target musical instruments via a musical score media player 500. Similarly, a user can record singing or non-musical sounds and have the score generation component 104 translate those sounds into a musical score file 108 for selected target instruments. By way of a non-limiting example, a collection of dog howls and cat sounds can be arranged to form the notes of a tune, and the score generation component 104 can analyze those animal sounds to find the closest corresponding notes that can be generated by selected target instruments and thereby generate a musical score file 108 for those target instruments.

The score generation component 104 thus allows a musician to compose music by playing music on an instrument without manually transcribing notes onto sheet music, as a recording of the music can be converted into a printable and playable music score file 108 by the score generation component 104. As such, a composer can share a music score file 108 with critics for opinion or review, a music teacher can print sheet music from a music score file 108 generated from music spontaneously composed during a music class, and musicians who are hard of hearing or have memory disabilities can generate a record of music they compose.

The score generation component 104 also allows musical score files 108 to be generated from pre-recorded music or sounds. By way of a non-limiting example, a parent can encourage a child to learn to play music by using the score generation component 104 to generate a musical score file 108 from a recording of the child's favorite popular music song, and then printing sheet music from the musical score file 108 for a target instrument that the child is learning to play. By way of another non-limiting example, the score generation component 104 can generate a musical score file 108 for a guitar and a piano based on a recording of an acapella song. As such, although the original recording was the sounds of the human voice, sheet music can be printed form the musical score file 108 such that notes approximating the sounds of the recorded human voice can be played on the guitar and/or piano.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method of generating a musical score file, comprising:

receiving input audio data at a musical score generation device running a score generation component;

receiving a selection of one or more target musical instruments at the score generation component;

identifying candidate musical notes within the input audio data with the score generation component by performing a frequency analysis on the input audio data to identify segments of the input audio data that share substantially the same audio frequency;

creating a musical score file with a page description header that identifies print settings and a musical instruments information section that identifies the one or more target musical instruments;

identifying musical note information for the one or more target musical instruments by finding a best match for the candidate musical notes in audio data in a sound database for the one or more target musical instruments; and adding the identified musical note information to musical score data associated with the one or more target musical instruments in the musical score file.

2. The method of claim 1, further comprising:

identifying chord information by finding a best match for a plurality of pieces of identified musical note information in the sound database for the one or more target musical instruments, and adding the identified chord information to musical score data associated with the one or more target musical instruments in the musical score file.

3. The method of claim 1, further comprising:

identifying rhythm information in the sound database that matches or complements the relative timing of identified musical note information, and adding the identified rhythm information to musical score data associated with the one or more target musical instruments in the musical score file.

4. The method of claim 1, wherein a piece of musical score data identifies a musical note, a musical key, a note length, and a playback start time.

5. The method of claim 4, wherein the piece of musical score data further identifies a playback instruction for the target musical instrument.

6. The method of claim 1, wherein the score generation component updates offset values in the musical instruments information section that points to the beginning of the musical score data for each target musical instrument as data is added to musical score data.

7. The method of claim 1, wherein the musical score generation device:

stores received input audio data in memory for review and playback;

deletes the input audio data upon receipt of a user instruction to discard the input audio data; and activates the score generation component upon receipt of a user instruction to generate the music score file based on the input audio data.

8. The method of claim 1, wherein the musical score generation device is a printer with a musical score page description language raster image processor configured to generate a music score sheet for each target musical instrument identified in the musical instruments information section such that the printer prints pages of the music score sheet, wherein the music score sheet for each target musical instrument is generated based on page description language commands in the page description header and the musical score data associated with that target musical instrument.

9. The method of claim 1, wherein the musical score generation device has a musical score media player that generates audio for each target musical instrument identified in the musical instruments information section based on the musical score data associated with that target musical instrument.

10. The method of claim 9, wherein the musical score media player generates audio for a target musical instrument using prerecorded audio samples that most closely match the musical score data.

11. The method of claim 9, wherein the musical score media player generates audio for a target musical instrument using digitally generated audio according to the musical score data.

12. The method of claim 1, further comprising displaying the musical score data in the musical score file on a screen.

13. A printer, comprising:

a score generation component that follows a set of instructions to:

receive input audio data and a selection of one or more target musical instruments at the score generation component;

identify candidate musical notes within the input audio data by performing a frequency analysis on the input audio data to identify segments of the input audio data that share substantially the same audio frequency;

create a musical score file with a page description header that identifies print settings and a musical instruments information section that identifies the one or more target musical instruments;

identify musical note information for the one or more target musical instruments by finding a best match for the candidate musical notes in audio data in a sound database for the one or more target musical instruments; and add the identified musical note information to musical score data associated with the one or more target musical instruments in the musical score file;

a musical score page description language raster image processor that follows a set of instructions to:

generate a music score sheet for each target musical instrument identified in the musical instruments information section of the musical score file, wherein the music score sheet for each target musical instrument is generated based on page description language commands in the page description header and the musical score data associated with that target musical instrument; and a print engine configured to print images on a recording medium according to the music score sheets generated by the musical score page description language raster image processor.

14. The printer of claim 13, further comprising a musical score media player that follows a set of instructions to generate audio for each target musical instrument identified in the musical instruments information section based on the musical score data associated with that target musical instrument, and that outputs the generated audio for playback on speakers.

15. The printer of claim 13, wherein the score generation component further:

identifies chord information by finding a best match for a plurality of pieces of identified musical note information in the sound database for the one or more target musical instruments, and adds the identified chord information to musical score data associated with the one or more target musical instruments in the musical score file.

16. The printer of claim 13, wherein the score generation component further:

identifies rhythm information in the sound database that matches or complements the relative timing of identified musical note information, and adds the identified rhythm information to musical score data associated with the one or more target musical instruments in the musical score file.

17. The printer of claim 13, wherein a piece of musical score data identifies a musical note, a musical key, a note length, and a playback start time.

18. The printer of claim 17, wherein the piece of musical score data further identifies a playback instruction for the target musical instrument.

19. A musical score generation device, comprising:

a score generation component that follows a set of instructions to:

receive input audio data and a selection of one or more target musical instruments at the score generation component;

identify candidate musical notes within the input audio data by performing a frequency analysis on the input audio data to identify segments of the input audio data that share substantially the same audio frequency;

create a musical score file with a page description header that identifies print settings and a musical instruments information section that identifies the one or more target musical instruments;

identify musical note information for the one or more target musical instruments by finding a best match for the candidate musical notes in audio data in a sound database for the one or more target musical instruments; and add the identified musical note information to musical score data associated with the one or more target musical instruments in the musical score file; and a display component that displays the identified musical note information in the musical score file on a screen.

20. The musical score generation device of claim 19, further comprising a sound output component that audibly plays sounds corresponding to the identified musical note information in the musical score file during display of the identified musical note information on the screen.

* * * * *